(12) United States Patent
Furuichi et al.

(10) Patent No.: US 6,549,689 B2
(45) Date of Patent: Apr. 15, 2003

(54) OPTICAL SWITCH

(75) Inventors: Shinji Furuichi, Mohka (JP); Fumio Nitanda, Fukaya (JP)

(73) Assignee: Hitachi Metals, Ltd., Tokyo (JP)

( * ) Notice: Subject to any disclaimer, the term of this patent is extended or adjusted under 35 U.S.C. 154(b) by 128 days.

(21) Appl. No.: 09/770,490

(22) Filed: Jan. 29, 2001

(65) Prior Publication Data

US 2002/0097949 A1 Jul. 25, 2002

(30) Foreign Application Priority Data

Nov. 24, 2000 (JP) .................................... 2000-356926

(51) Int. Cl.[7] .............................. G02B 6/26; G02B 6/35
(52) U.S. Cl. ............................ 385/16; 385/25; 385/31; 385/50; 385/137
(58) Field of Search ............................. 385/16, 21, 22, 385/25, 31, 50, 136, 137, 139, 147

(56) References Cited

U.S. PATENT DOCUMENTS 6,169,826 B1 * 1/2001 Nishiyama et al. ........... 385/22

FOREIGN PATENT DOCUMENTS

| JP | 2994807 | 10/1999 |
|----|---------|---------|
| JP | 3062881 | 5/2000  |

* cited by examiner

*Primary Examiner*—Hemang Sanghavi
*Assistant Examiner*—Omar Rojas (57) ABSTRACT

An optical switch comprising a fixed optical-fiber holder for holding either of input/output optical fibers, a movable optical-fiber holder for holding the other of the input/output optical fibers, which faces the fixed optical-fiber holder and is movable with respect to the fixed optical-fiber holder, and a driver for moving the movable optical-fiber holder with respect to the fixed optical-fiber holder immersed in the refractive index matching material, such as silicone oil. Inside the housing provided are a heater for heating the refractive index matching material, a means for sensing temperature inside the housing, and a controller for turning on the power to the heater when the measured value of the temperature sensing means is lower than a first predetermined value, and turning off the power to the heater when the measured value of the temperature sensing means is higher than a second predetermined value. This optical switch is capable of maintaining proper operation even when its service temperature becomes low, and preventing overheat.

16 Claims, 9 Drawing Sheets

OPTICAL SWITCH

BACKGROUND OF THE INVENTION

1. Field of the Invention

The present invention relates generally to an optical switch, and more specifically to an optical switch suitable for use in optical communications equipment and optical transmission equipment.

2. Description of the Related Art

With the progress of optical communications, fiber optics communications networks have been increasingly involved with long optical paths and complex branches. Under these circumstances, the need for switching optical paths between circuits has been mounting in optical communications and optical transmission equipment, and an increasing number of optical switches have been used to meet the need.

Various types of optical switches for switching optical paths have so far been proposed, including a type in which the traveling direction of light is switched by electrically altering the refractive index or phase of a light path, and a type in which the traveling direction of light is switched by mechanically moving the light path. Among them, the mechanical optical switch is being widely used in optical communications equipment, optical transmission equipment, etc. because it has low coupling loss, virtually no dependence on the wavelength of propagating light, and such a unique property that even after power is turned off, the light coupling state before turning off the power can be maintained.

Mechanical optical switches include the one disclosed in Japanese Patent No. 3,062,881. This optical switch comprises an electromagnetic actuator (optical switch driver) having a fixed optical fiber holder for holding an output optical fiber end, and a movable optical fiber holder for holding an elastically deformable input optical fiber end, both disposed facing each other via a small gap, so that the movable optical fiber holder is caused to make a relative movement with respect to the fixed optical fiber holder.

Since the mechanical optical switch has a small gap between the input and output optical fibers, the gap is often filled with silicone oil to prevent light from attenuating or scattering in the gap. Silicone oil used for this purpose is called the refractive index matching material. The refractive index matching material is charged into an optical switch housing so that the refractive index matching material fills up a space between the ends of optical fibers. To achieve this, the input optical fiber and the electromagnetic actuator (optical switch driver) must be allowed to move and operate in the refractive index matching material.

The optical switch is usually used not only in temperate regions but also in cold regions, and even outdoors in some cases. In cold regions, there are not a few cases in which temperature falls down to −20° C., or even to −50° C. in very cold days. Furthermore, even when the optical switch is used indoors, it is often installed in an non-air-conditioned room. It is often exposed to extremely cold temperatures in winter. In such a low temperature, operation of an optical switch having a refractive index matching material might involve some difficulty. This is attributed to that the position of optical fibers in the optical switch is unwantedly shifted, or the viscosity of the refractive index matching material rises, making the optical switch inoperative. When the temperature of the optical switch rises, not only properties of magnetic materials constituting the electromagnetic actuator, the fixed optical fiber holder, and the movable optical fiber holder in the optical switch could deteriorate, but the adhesive resin used to bond the optical switch housing could also deteriorate. This, together with the swelling of the components and the refractive index matching material, could lead to leakage of the refractive index matching material from the bonded parts of the housing.

SUMMARY OF THE INVENTION

It is therefore an object of the present invention to provide an optical switch that can ensure proper operation even in low-temperature service environments and prevent the switch from being subjected to excessively high temperatures.

It is another object of the present invention to provide an optical switch that can ensure proper operation with a small optical switch without increasing the thickness thereof.

It is a further object of the present invention to provide an optical switch that in the event of malfunction or failure of proper operation, can keep the switch inoperative until the proper operation of the switch is restored.

The optical switch according to the present invention comprises a housing, a fixed optical fiber holder that holds at least one output/input optical fiber end within the housing, a movable optical fiber holder that holds at least one input/output optical fiber end within the housing, and is allowed to make a relative movement with respect to the fixed optical fiber holder facing it, a driver for causing the movable optical fiber holder to make a relative movement with respect to the fixed optical fiber holder, and causing at least one input optical fiber end to relatively move from or to a location facing at least one output optical fiber end, a refractive index matching material packed in the housing and at least between the ends of the output optical fiber and the input optical fiber, a heater for heating the refractive index matching material within the housing, a temperature sensing means for detecting the temperature in the housing, and a controller for turning on and off the power to the heater using the temperature sensing means.

The terms "output/input optical fiber" and "input/output optical fiber" means that when the output optical fiber of the output-input optical fiber is held by the fixed optical fiber holder, the input optical fiber of the input-output optical fiber is held by the movable optical fiber holder, or vice versa. The same holds true throughout the Specification.

In the aforementioned optical switch, the heater and the temperature sensing means should be in contact with the refractive index matching material in the housing. Furthermore, the controller can turn on the power to the heater when the measured value of the temperature sensing means is lower than a first predetermined value, and can turn off the power when the measured value of the temperature sensing means is higher than a second predetermined value. When an instruction to drive the driver is given from outside, the controller can drive the driver in accordance with the measured value of the temperature sensing means. The controller can drive the driver with a delay of a predetermined time after the power to the heater is turned on.

Furthermore, the optical switch according to the present invention can have a second temperature sensing means for detecting the temperature outside the housing. When the measured value of the second temperature sensing means is lower than a predetermined value, the controller can turn on the power to the heater, and when the measured value of the temperature sensing means for detecting the temperature in the housing (internal temperature sensing means) is higher than a second predetermined value, the controller can turn off the power to the heater.

The optical switch according to the present invention can comprise

- a housing,
- a fixed optical fiber holder that holds at least one output/input optical fiber end within the housing,
- a movable optical fiber holder that holds at least one input/output optical fiber end within the housing, and is allowed to make a relative movement with respect to the fixed optical fiber holder facing it,
- a driver for causing the movable optical fiber holder to make a relative movement with respect to the fixed optical fiber holder, and causing at least one input optical fiber end to relatively move from or to a location facing at least one output optical fiber end,
- a refractive index matching material packed in the housing and at least between the ends of the output optical fiber and the input optical fiber,
- a heater for heating the refractive index matching material within the housing, and
- a PTC(positive temperature-coefficient) resistive element connected in series to the heater in the housing. The heater and the PTC resistive element should preferably be in contact with the refractive index matching material in the housing. It is also desirable that the PTC resistive element should have its Curie point in the range of 0° C. to 60° C.

The optical switch according to the present invention can comprise

- a housing,
- a fixed optical fiber holder that holds at least one output/input optical fiber end within the housing,
- a movable optical fiber holder that holds at least one input/output optical fiber end within the housing, and is allowed to make a relative movement with respect to the fixed optical fiber holder facing it,
- a driver for causing the movable optical fiber holder to make a relative movement with respect to the fixed optical fiber holder, and causing at least one input optical fiber end to relatively move from or to a location facing at least one output optical fiber end,
- a refractive index matching material charged in the housing and at least between the ends of the output optical fiber and the input optical fiber,
- a heater for heating the refractive index matching material within the housing, and
- a bimetal switch connected in series to the heater in the housing. The heater and the bimetal switch should preferably be in contact with the refractive index matching material in the housing. The bimetal switch can be turned off in the range of 0° C. to 60° C.

The optical switch according to the present invention can comprise

- a housing made of a self-temperature controlled ceramic heater,
- a fixed optical fiber holder that holds at least one output/input optical fiber end within the housing,
- a movable optical fiber holder that holds at least one input/output optical fiber end within the housing, and is allowed to make a relative movement with respect to the fixed optical fiber holder facing it,
- a driver for causing the movable optical fiber holder to make a relative movement with respect to the fixed optical fiber holder, and causing at least one input optical fiber end to relatively move from or to a location facing at least one output optical fiber end,
- a refractive index matching material charged in the housing and at least between the ends of the output optical fiber and the input optical fiber, and
- current-carrying lead wires connected to the ceramic heater. At least part of the self-temperature controlled ceramic heater should preferably be in contact with the refractive index matching material, and the ceramic heater is a PTC resistive element having a Curie point in the range of 0° C. to 60° C.

DESCRIPTION OF THE PREFERRED EMBODIMENTS

EXAMPLE 1

Figure 1:
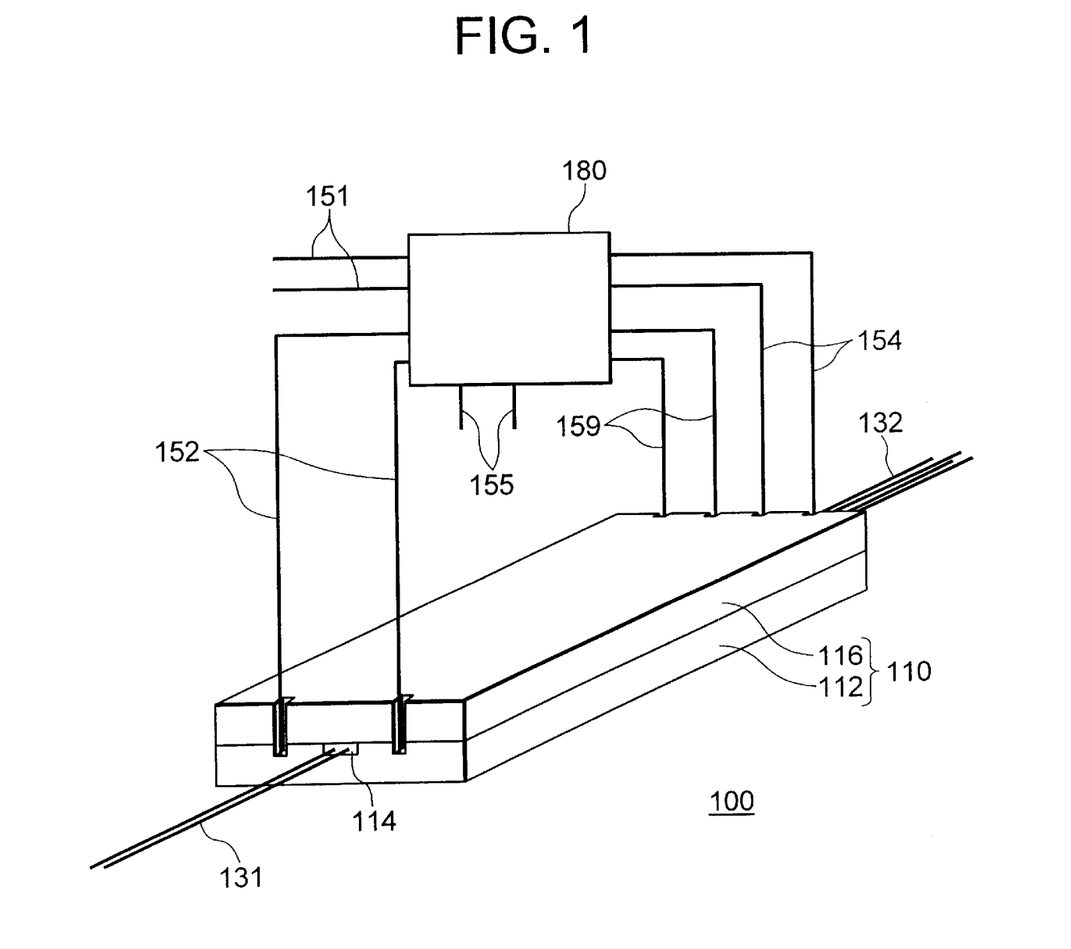
FIG. 1 is a perspective view of an optical switch embodying the present invention, with the controller thereof shown in a block diagram.

An optical switch according to a first embodiment of the present invention will be described, referring to FIGS. 1 through 4. FIG. 1 is a perspective view of an optical switch 100 showing a housing 110 in which the mechanism of the optical switch is contained. The housing 110 comprises a box-shaped housing base 112 on which a housing cover 116 is placed; the base and cover bonded together with an adhesive, such as epoxy resin. An input optical fiber 131 is passed through an opening 114 formed between a groove formed on an end face of the housing base 112 and the lower surface of the housing cover 116, and connected to an optical switch mechanism 130 (not shown in FIG. 1) provided inside the housing 110. An output optical fiber 132 is passed through an opening 114 formed on the opposite side surface of the housing 110, and connected to the optical switch mechanism 130 provided inside the housing 110. The input and output optical fibers 131 and 132 are each fixedly fitted to the openings 114 with an adhesive, and the openings 114 are sealed with an adhesive. Signal lead wires 152 for operating the optical switch and lead wires 154 for feeding power to the heater are connected to the housing 110. The lead wires 154 for feeding power to the heater are connected to the heater 156 (not shown in FIG. 1) via a controller 180 to turn on and off the power from a power source, and signal wires 159 from a temperature sensing means 158 (not shown in FIG. 1) provided inside the optical switch housing are connected to the controller.

Figure 2:
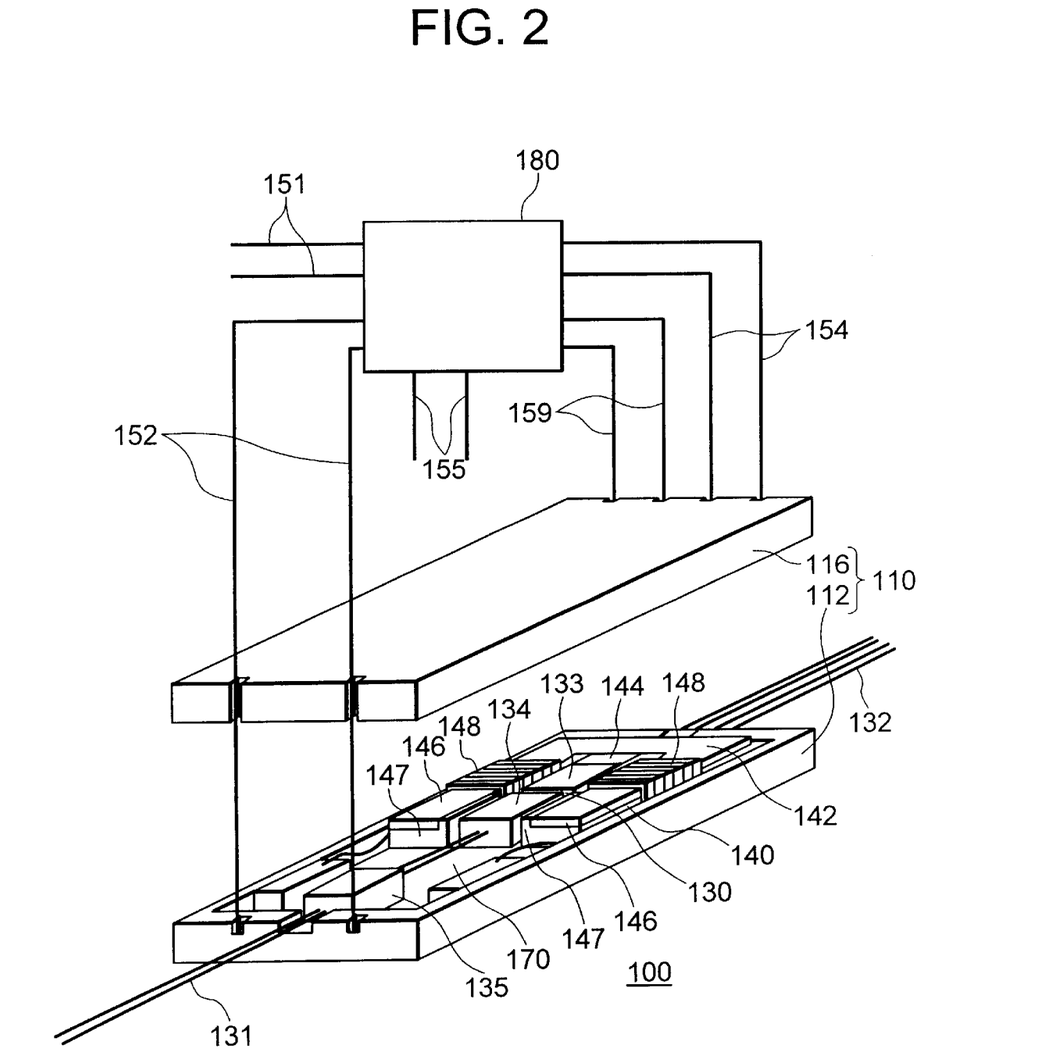
FIG. 2 is a developed perspective view of the optical switch shown in FIG. 1, with the controller thereof shown in a block diagram.
Figure 3:
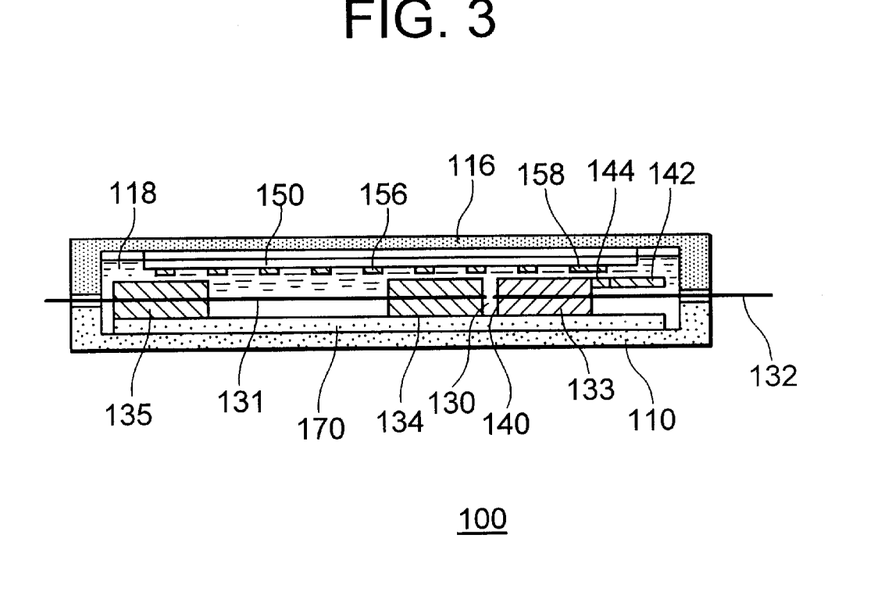
FIG. 3 is a longitudinal sectional view of FIG. 1.

FIG. 2 is a developed perspective view illustrating the construction of the optical switch 100, and FIG. 3 is a longitudinal sectional view of FIG. 1.

In FIGS. 2 and 3, the optical switch mechanism 130 is provided on a glass substrate fixedly fitted inside the housing base 112 where the optical switch 130 has an optical switch driver 140, a fixed optical fiber holder 133 that serves as a central leg of an E-shaped magnetic circuit 142 of the optical switch driver 140, a movable optical fiber holder 134 that can make relative movement with the fixed optical fiber holder 133 facing the movable optical fiber holder between the end legs of the E-shaped magnetic circuit 142 of the optical switch driver 140, a fixed optical fiber holder 135 for holding input optical fibers 131 in the house base 112. The input optical fibers 131 are passed through openings provided on the fixed optical fiber holder 135 and held there, and then passed through openings provided on the movable optical fiber holder 134 and held there; ends of the input optical fibers 131 face ends of the output optical fibers 132 to transmit optical signals. The output optical fibers 132 are passed through openings provided on the fixed optical fiber holder 133 and held there. The movable optical fiber holder 134 faces the fixed optical fiber holder 133 to make relative movement with it, so that connections to the input optical fibers 131 can be changed over between the output optical fibers 132, or connections between the input optical fibers 131 and the output optical fibers 132 can be made or broken.

The optical switch driver 140 has a permanent magnet block 144 on the bottom of the central leg of the E-shaped magnetic circuit 142, a fixed optical fiber holder 133 made of a soft magnetic material, and a movable optical fiber holder 134 made of a soft magnetic material that makes relative movement with the fixed optical fiber holder 133 at a location facing the fixed optical fiber holder 133. Other parts of the E-shaped magnetic circuit 142 are made of a soft magnetic material, and pole pieces 147 are provided at locations where the end legs of the E-shaped magnetic circuit 142 face each other so that the movable optical fiber holder 134 can move between the pole pieces 147. Exciting coils 148 are wound on the end legs of the E-shaped magnetic circuit 142. An attractive force is produced between the movable optical fiber holder and any one of the two pole pieces, or a repulsive force is produced between the movable optical fiber holder and the other pole piece, depending on the direction in which exciting current is caused to flow from the signal lead wires 152 to the exciting coils 148 via signal terminals, or vice versa. Thus, the movable optical fiber holder 134 can be moved between the pole pieces 147, thereby changing over the optical switch.

To prevent the locations of the movable and fixed optical fiber holder 134 and 133 to be shifted during relative movement between them, a positioning pin should preferably be provided on any one facing surface of the holder so that the pin can be guided to a slotted hold provided on the other facing surface. The guide pin and slotted hole are not shown in the figures.

The construction and operation of the optical fiber driver and the guide mechanism are described in detail in Japanese Patent No. 3,062,881 (U.S. patent application Ser. No. 09/306,911, application date: May 7, 1999), which is made as a reference.

A refractive index matching material 118, such as silicone oil, is charged inside the housing 110, and the optical switch mechanism 130 is immersed in the refractive index matching material 118. The refractive index matching material 118 also fills up a space between the ends of the input optical fibers 131 and the output optical fibers 132. The input optical fibers 131 and the movable optical fiber holder are caused to move by the optical switch driver in the refractive index matching material. Since the base and cover of the housing are bonded together with an adhesive and the opening 114 sealed with an adhesive, as described above, the refractive index matching material charged in the housing is prevented from leaking through the bonded parts.

Figure 4:
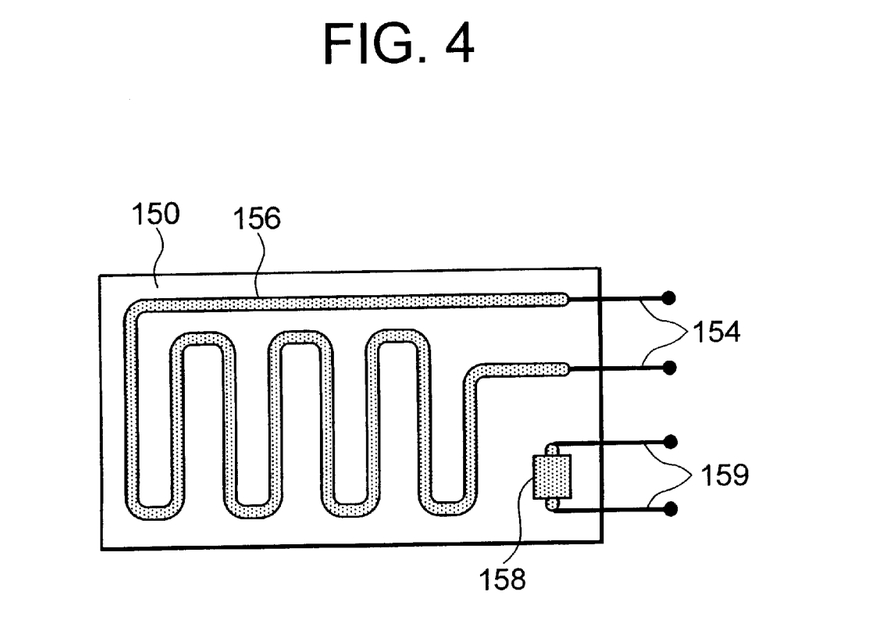
FIG. 4 is a plan view of a heater that can be used in the optical switch shown in FIG. 1.

A substrate 150 having a heater 156 mounted on the surface thereof is provided on the lower inside surface of the housing cover 116, as shown in FIG. 3. The heater 156 is installed in such a manner as to cover the inside surface of the housing cover. Power is fed to the heater 156 via lead wires 154. As the heater used here, the type shown in the plan view of FIG. 4 is suitable. The heater shown in FIG. 4 is a heater obtained by depositing a film pattern comprising carbon, a nickel-chromium alloy, or silicon carbide on a glass substrate 150. Since the silicon-carbide heater has a specific resistance of 0.08 to 2 $\Omega \cdot cm$, more than two digits higher than that of carbon or nickel-chromium alloy film, even a short length of a heating element made of it can have a sufficient calorific value. A temperature sensing means 158 is provided on the substrate 150 near the heater 156. The temperature sensing means 158 is formed by screen-printing a mixture of ceramic powder (a $BaTiO_3$ film obtained by replacing part of Ba with La or Sr and adding metal oxides or oxides of rare earth elements) having a highly temperature-dependent electrical resistance and a binder, and sintering the screen-printed mixture and connecting lead wires to it. The temperature sensing means 158 may be manufactured by machining bulk ceramic material or forming a film by sputtering. The temperature sensing means 158 may be made of an alumel-chromel thermocouple in place of ceramic material having a highly temperature-dependent electrical resistance. The use of the thermocouple could eliminate the need for flowing current in the temperature sensing means, making processing circuitry simpler because voltage is developed in accordance with temperature changes.

The substrate 150 on which the heater 156 and the temperature sensing means 158 are mounted should preferably be such that the heater 156 and the temperature sensing means 158 are mounted on the lower inside surface of the housing cover 116 so that they face downward, or toward the optical switch mechanism 130, as shown in FIG. 3. The refractive index matching material 118 is charged inside the housing to such an extent that the heater and the temperature sensing means are completely immersed in the refractive index matching material 118. Since the surfaces of the heater and the temperature sensing means are in contact with the refractive index matching material 118, the temperature sensing means can measure the temperature of the refractive index matching means as the heat generated in the heater is transmitted to the refractive index matching material 118. Thus, the refractive index matching material 118 in which the optical switch mechanism is immersed can be set to an aimed temperature.

Both the heater power lead wires 154 and the temperature sensing means signal wires 159 are connected to the controller 180, as in the case of the signal lead wires 152 connected to the optical switch driver. Furthermore, power feeding lead wires 155 and signal lead wires 151 for receiving optical switch changeover signals are also connected to the controller 180. The power feeding lead wires 155 are connected to a power source (not shown) to feed power to the controller 180, the heater 156, the optical switch driver, etc.

Figure 5:
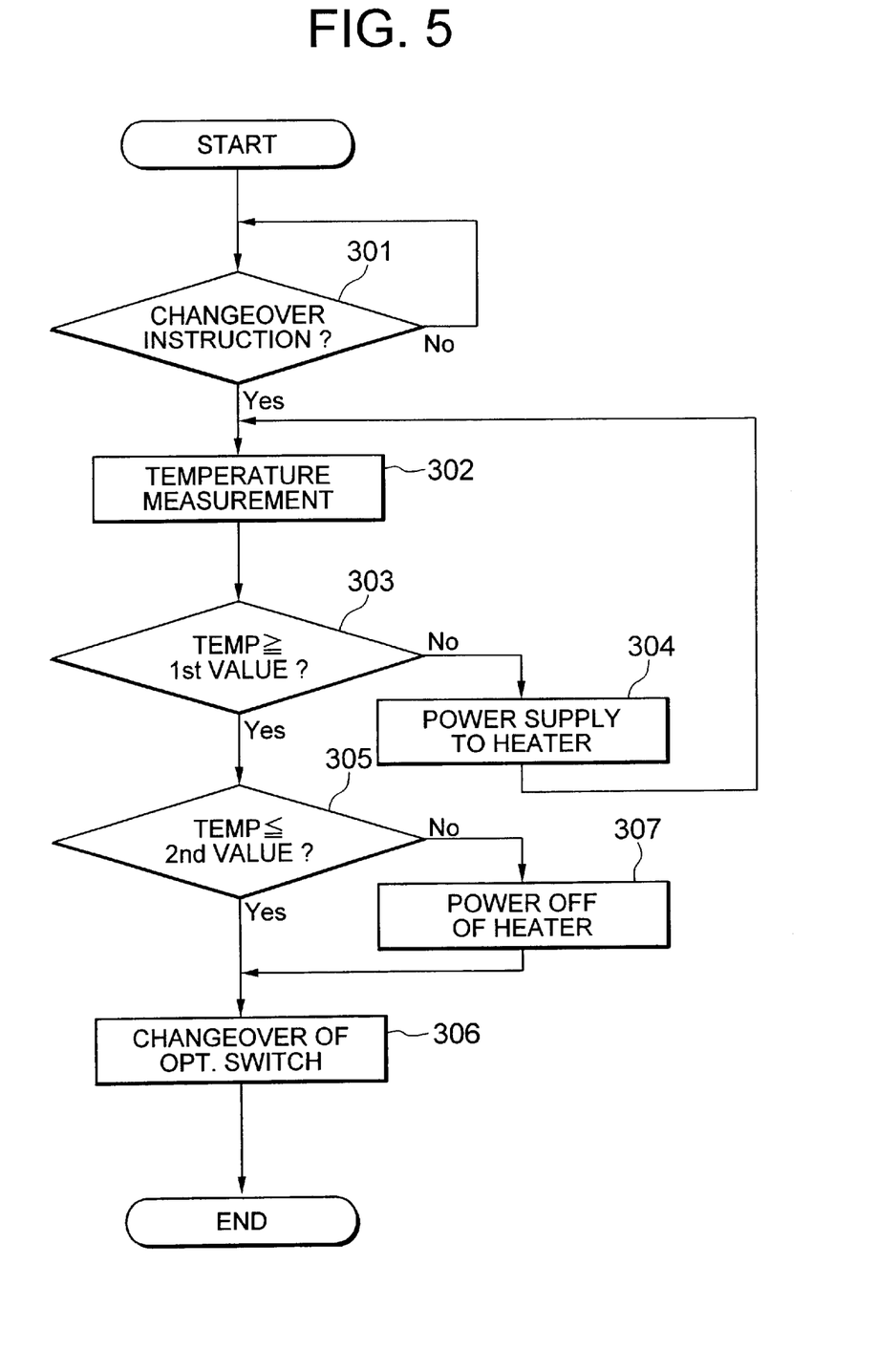
FIG. 5 is a flow chart showing an example of the operation of the controller of the optical switch according to the present invention.

A typical operation of the controller 180 is shown in the flow chart of FIG. 5. The controller 180, which is ready for receiving optical switch changeover signals transmitted via the signal lead wires 151, judges whether there is an instruction to change over the optical switch in Step 301, and upon receipt of a changeover instruction, measures the temperature in Step 302. In Step 303, the controller 180 judges whether the temperature of the temperature sensing means 158 exceeds a first predetermined value, which is set in advance to −5° C., or 0° C., etc. This temperature value should preferably be set to a value above the temperature at which the viscosity of the refractive index matching material becomes low enough to change over the optical switch. When the temperature is below the first predetermined value in Step 303, then the process proceeds to Step 304 where power is fed to the heater 156 via the lead wires 154. As the heater 156 is immersed in the refractive index matching material 118, the refractive index matching material 118 is heated by the heater 156. The loop of Steps 302 through 304 is repeated until the temperature of the refractive index matching material reaches the first predetermined value. When the temperature of the refractive index matching material reaches the first predetermined value, the process proceeds to Step 305 where whether the temperature of the refractive index matching material is below a second predetermined value is judged. The second predetermined value is set to a temperature above which the refractive index matching material is likely to leak from the optical switch housing, to 70° C. or 80° C., for example. As the temperature is normally below the second predetermined value, the process proceeds to Step 306 where the changeover signal is sent to the exciting coil 148 of the optical switch driver 140 via the signal lead wires 152, and the optical switch is changed over. If the temperature of the refractive index matching material 118 exceeds the second predetermined value in Step 305, the heater 156 is turned off in Step 307, and the process proceeds to Step 306.

The operation of the controller 180 described above is only an example. If the heater is set in advance to turn off the power after a shorter period of time in Step 304, Steps 305 and 307 can be eliminated. Furthermore, the presence/absence of a changeover instruction in Step 301 can be carried out immediately before Step 306.

Figure 6:
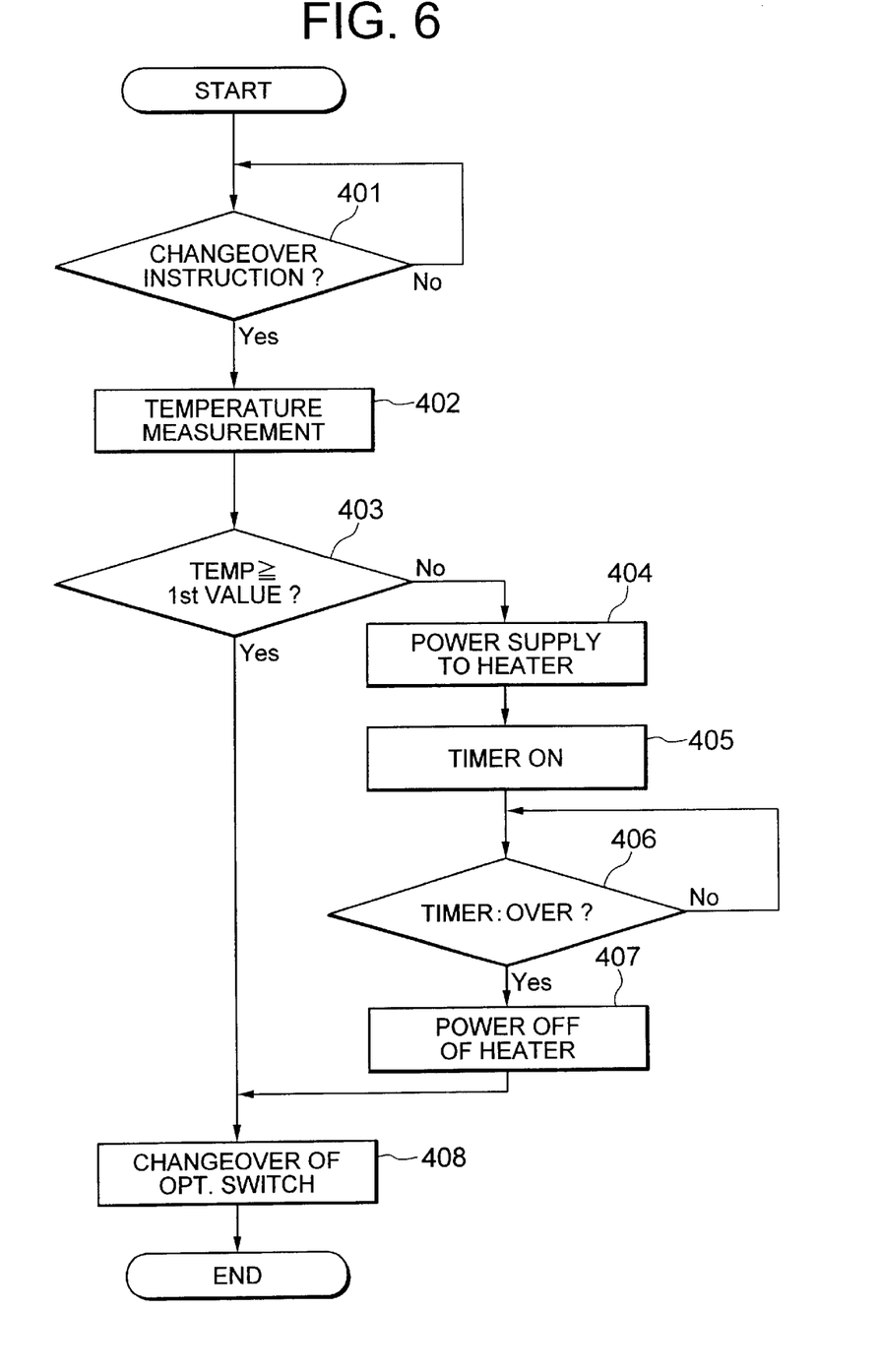
FIG. 6 is a flow chart showing another example of the operation of the controller of the optical switch according to the present invention.

Another example of the operation of the controller 180 is shown in the flow chart of FIG. 6. This example is the case where although the temperature is a little too low to change over the optical switch driver, the optical switch driver can be operated by feeding power to the heater for a predetermined short period of time. As the time to feed power to the heater is set to the predetermined short period of time, there is no fear of the optical switch being overheated even when the upper limit of the internal temperature is not controlled.

In the flow chart of FIG. 6, when a changeover instruction is given in Step 401, the temperature is measured in Step 402. In Step 403, when it is judged that the temperature is a value at which the optical switch can be changed over, the process proceeds to Step 408 where the optical switch is operated. If the temperature is judged to be too low in Step 403, power is fed to the heater in Step 404, and the timer is turned on in Step 405. In Step 406, the timer judges whether a predetermined time has been elapsed, and the heater is turned off in Step 407. The optical switch is changed over in Step 408. When the timer judges that a predetermined time has not been elapsed, the process waits until the predetermined time is elapsed.

EXAMPLE 2

In this example, an optical switch of the same construction as the optical switch used in the previous example is used, except that an external temperature sensor mounted on the outside of the optical switch housing is used as a second temperature sensing means to measure the environmental temperature. In the following, an example of the operation of the controller when power to the heater is turned on in accordance with the environmental temperature will be described, referring to the flow chart of FIG. 7.

Figure 7:
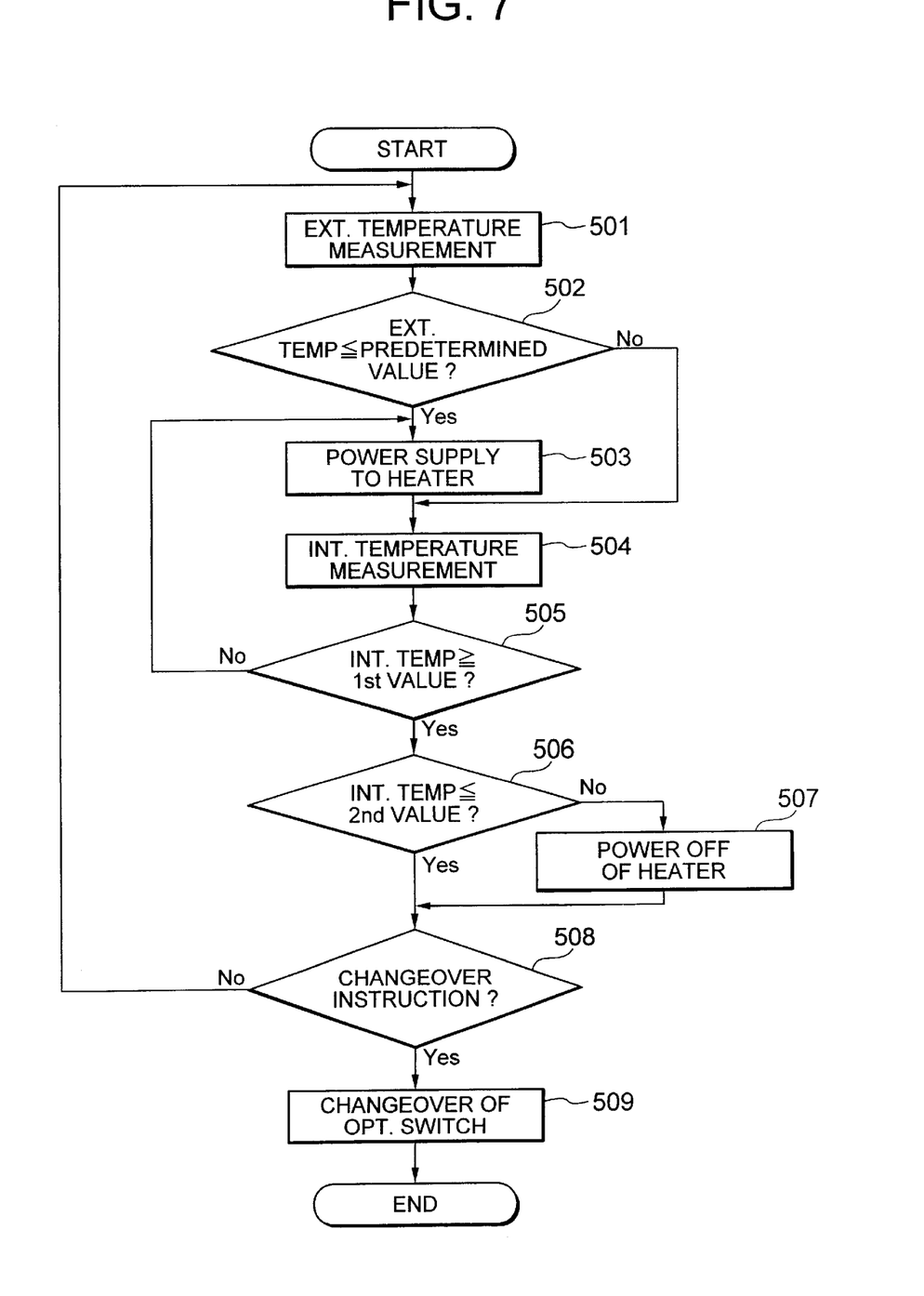
FIG. 7 is a flow chart showing still another example of the operation of the controller of the optical switch according to the present invention.

In FIG. 7, the external temperature is measured with the external temperature sensor in Step 501. In Step 502, whether the measured value is lower than a predetermined value is judged. If the measured value of external temperature is high enough to change over the optical switch driver, the process proceeds to Step 504 to measure the internal temperature. In Step 502, when the external temperature is found to be lower than a predetermined value, power is fed to the heater in Step 503, and the process proceeds to Step 504. When the internal temperature measured in Step 504 is compared with a first predetermined value in Step 505, and the internal temperature is found to be too low to change over the optical switch driver, the process is returned to Step 503, and the loop of Steps 503 through 505 is repeated. If the internal temperature is enough to change over the optical switch driver, the process proceeds to Step 506 where the internal temperature is compared with a second predetermined value. The second predetermined value is set to a temperature above which the refractive index matching material is likely to leak from the optical switch housing, as in the case described in reference to FIG. 5. If the internal temperature exceeds it, the process proceeds to Step 507 where the heater is turned off. The process then proceeds to Step 508. Since the internal temperature is normally lower than the second predetermined value, whether there is a changeover instruction is judged in Step 508. If there is a changeover instruction, then the optical switch is changed over in Step 509. If there is no changeover instruction in Step 508, the process is returned to Step 501.

EXAMPLE 3

Figure 8:
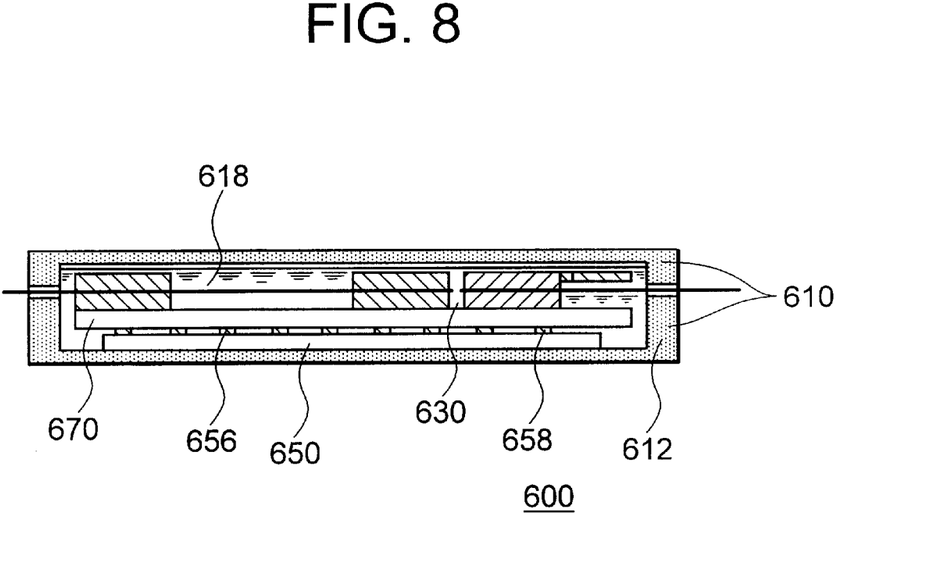
FIG. 8 is a longitudinal sectional view of an optical switch in another embodiment of the present invention.

FIG. 8 is a longitudinal sectional view of an optical switch 600 in another embodiment of the present invention. A heater substrate 650 used in this embodiment is the same as the heater substrate 150 used in FIGS. 1 through 4, except that it is provided upside down. An optical switch 600 in this embodiment is such that a heater substrate 650 is provided between a substrate 670 on which an optical switch mechanism 630 is mounted and the bottom of a housing base 612, unlike the embodiment shown in FIGS. 1 through 3 where the glass substrate on which the heater shown in FIG. 4 is mounted is provided on the inside surface of the housing cover.

In this example where the heater substrate 650 is provided on the bottom of the housing base 612, when the housing is filled with a refractive index matching material 618 to immerse an optical switch mechanism 630 in the refractive index matching material 618, the heater substrate 650 is also completely immersed in the refractive index matching material 618. Thus, positive contact among a heater 656, a temperature sensing means 658 and the refractive index matching material 618 can be maintained.

EXAMPLE 4

Figure 9:
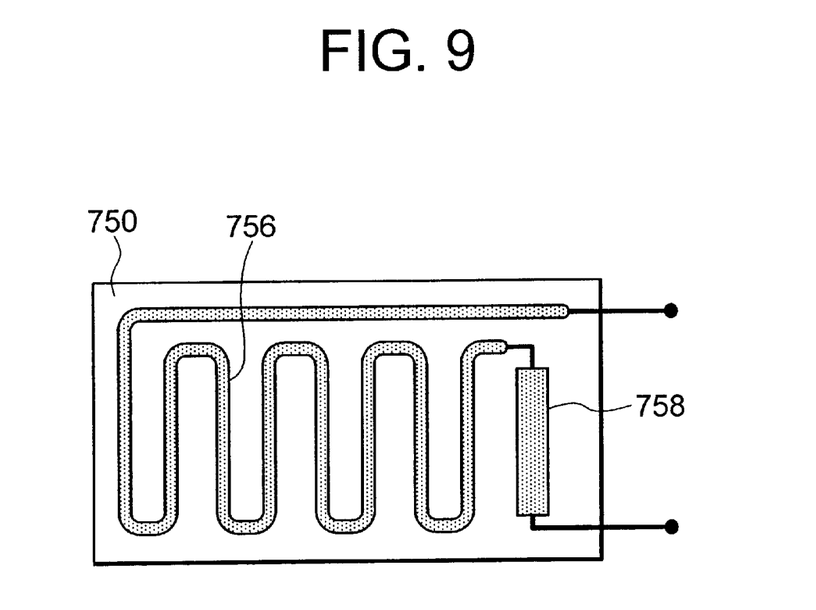
FIG. 9 is a plan view of another heater that can be used in the optical switch according to the present invention.

FIG. 9 is a plan view showing another example of heater that can be used in the optical switch according to the present invention. This heater can be used in the optical switches in EXAMPLE 1 or 3, in place of the heater shown in FIG. 4.

A heater 756 made of a thin-film pattern, and a heater substrate 750 are almost the same as the heater shown in FIG. 4, except that a PTC resistive element 758 is connected in series with the heater 756. The PTC resistive element 758 used here is a material, such as a $BaTiO_3$ ceramic material, whose resistance remains below a certain temperature determined by the type of material, and rises sharply above that temperature (called the Curie point). The PTC resistive element therefore exhibits almost insulating performance above the Curie point, preventing current from flowing. Since the PTC resistive element is connected in series to the heater, power is fed to the heater as the temperature of the optical switch remains low. As the temperature of the optical switch rises, the resistance increases, reducing heat generation, slowing the temperature rise. When the temperature reaches the Curie point, the current is interrupted and the temperature is kept at that level. When a PTC resistive element whose Curie point is in the range of 0 to 60° C. is used, the viscosity of the refractive index matching material can be kept at a level suitable for driving the optical switch driver, preventing the temperature from rising above the Curie point. In this case, too, it is desirable in properly maintaining temperature control to keep the heater and PTC resistive element on the heater substrate immersed in or in contact with the refractive index matching material.

In an optical switch using a PTC resistive element connected in series to a heater as shown in FIG. 9, no complex controller 180 as described in the previous embodiments is needed. By feeding power to the heater at all times, the optical switch can be maintained at a temperature suitable for driving the driver. There can be another arrangement where power is fed only when a driver start instruction signal is received, and the driver is changed over when the temperature of the optical switch reaches a predetermined temperature.

There can be still another arrangement where an external temperature sensor is additionally provided, and when the temperature detected by the external temperature sensor is below a predetermined value, power is fed to the heater to keep the temperature of the optical switch at a predetermined level, so that the driver can be changed over upon receiving a driver start instruction signal.

As a desirable PTC resistive element, a ceramic material in which part of Ba in a $BaTiO_3$ ceramic is replaced with Sr, Ce, Pb, etc., and a ceramic material in which part of Ti in a $BaTiO_3$ ceramic is replaced with Sn can be used. One molar fraction of a $BaTiO_3$ composition in which part of Ba is replaced with Sr, Ce, Pb, etc. is expressed as $(BaSrCePb)_1$, and one molar fraction of a $BaTiO_3$ composition in which part of Ti is replaced with Sn is expressed as $(TiSn)_1$. The Curie points and specific resistance values in the vicinity of the Curie points of the ceramic materials with compositions having varied amounts of substitutions are given in Table 1.

TABLE 1

| | (BaSrCePb) (TiSn)$O_3$ | | | | | Curie point | Specific |
|---|---|---|---|---|---|---|---|
| | (BaSrCePb)$_1$ | | | (TiSn)$_1$ | | temperature | resistance |
| No. | Ba | Sr | Ce | Pb | Ti | Sn | (° C.) | (K Ω cm) |
| 1 | 0.999 | 0.0 | 0.001 | 0 | 0.90 | 0.10 | 47 | 0.2 |
| 2 | 0.899 | 0.1 | 0.001 | 0 | 0.90 | 0.10 | 55 | 0.2 |
| 3 | 0.799 | 0.2 | 0.001 | 0 | 0.90 | 0.10 | 65 | 0.2 |
| 4 | 0.699 | 0.3 | 0.001 | 0 | 0.90 | 0.10 | 80 | 0.3 |
| 5 | 0.799 | 0.2 | 0.001 | 0 | 1.00 | 0.00 | 70 | 1.0 |
| 6 | 0.970 | 0.0 | 0 | 0.03 | 0.82 | 0.18 | 10 | 1.0 |
| 7 | 0.950 | 0.0 | 0 | 0.05 | 0.82 | 0.18 | 16 | 2.0 |

Figure 10:
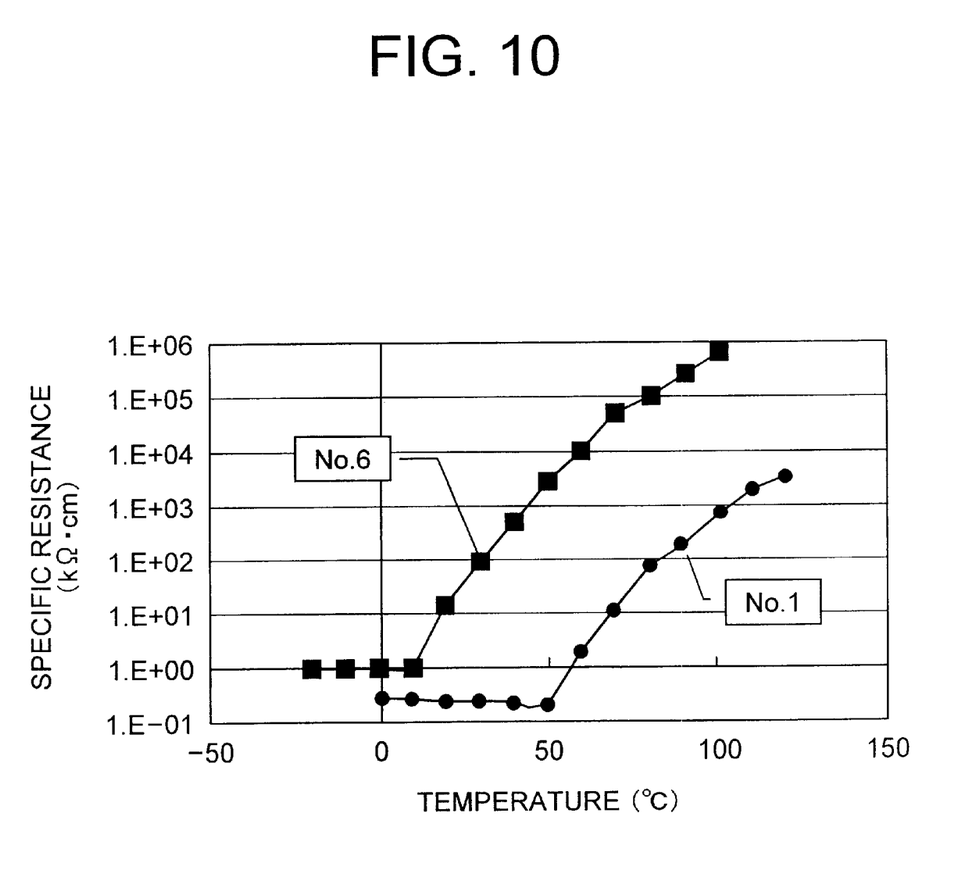
FIG. 10 is a graph showing the resistance-temperature characteristics of PTC resistive elements that can be used in the optical switch according to the present invention.

FIG. 10 is a graph showing the relationship between specific resistance and temperature for Composition Nos. 1 and 6. With Ceramic Composition No. 1, specific resistance is 0.2 Ω·cm at temperatures under 47° C., with the resistance sharply rising at temperatures exceeding that level. With Ceramic Composition No. 6, specific resistance is approximately 1.0 kΩ·cm at temperatures under 10° C., with the resistance sharply rising at temperatures exceeding that level. As is apparent from these graphs, when a ceramic material as a resistive element is connected in series to the heater, the resistance increases quickly as the temperature exceeds the Curie point to an extent that current is almost prevented from flowing, keeping the temperature at that level.

Although the PTC resistive element is connected in series to the heater in this example, a bimetal switch can be connected in series to the heater in place of the PTC resistive element. The bimetal switch to be used here should preferably be a type which turns off in the temperature range of 0 to 60° C. An optical switch using a bimetal switch can be operated in the same manner as in the above example.

EXAMPLE 5

Figure 11:
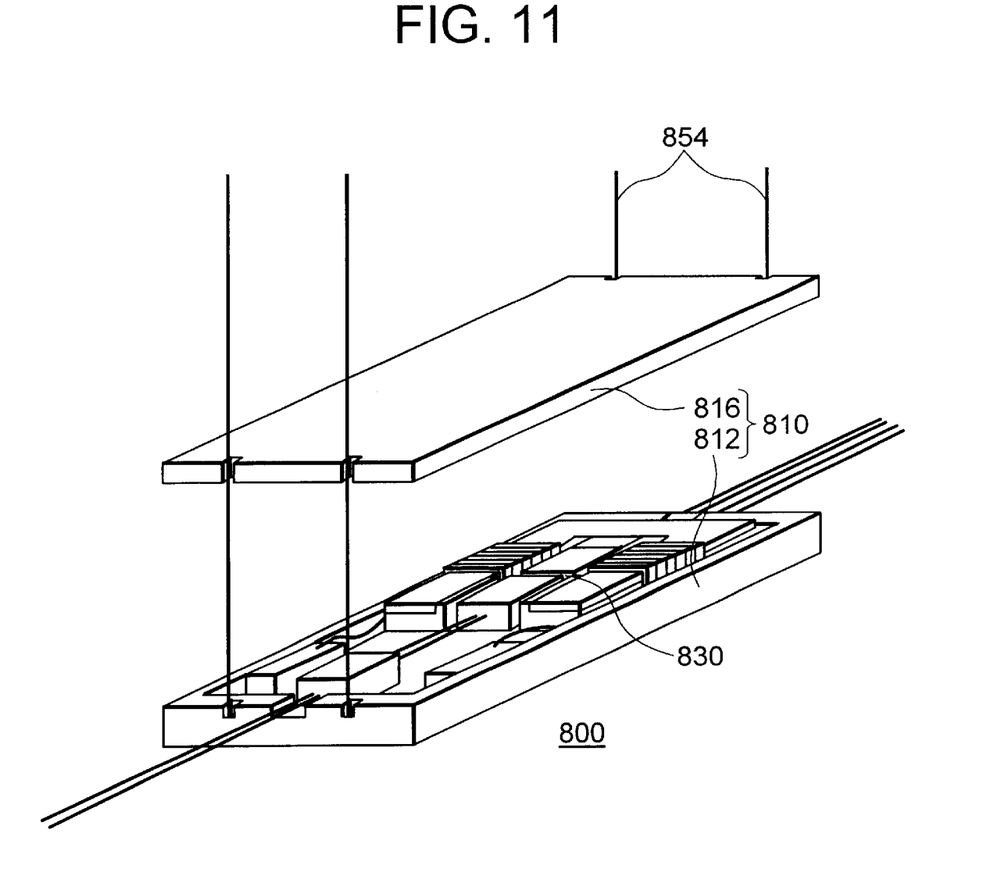
FIG. 11 is a developed perspective view of an optical switch having a ceramic heater in still another embodiment of the present invention.

FIG. 11 is a developed perspective view of an optical switch 800 in still another example of the present invention. In the figure, an optical switch mechanism 830 in a housing 810 is essentially the same as that used in the optical switch 100 in FIGS. 1 through 3, except that a housing cover 816 comprises a heater having as a chief ingredient a self-temperature controlled ceramic, such as barium titanate. Current-carrying lead wires 854 are provided on the housing cover 816 made of this ceramic.

The self-temperature controlled ceramic used here can be made of the same material as the PTC resistive element as described in EXAMPLE 4, having such a characteristic that although its resistance value remains low at temperatures under a certain degree, it sharply increases as temperature rises above that temperature, almost preventing current from flowing.

When part of the housing is made of this ceramic in a ceramic heater having the Curie point in the temperature range of 0 to 60° C., the temperature of the optical switch rises by feeding power to the ceramic heater as long as the temperature of the optical switch is low. The rate of temperature rise is slowed as the temperature rises, causing the resistance to increase. Above the Curie point, the resistance sharply rises, preventing current from flowing to discontinue heating. At temperatures below the Curie point, current is allowed to flow, resuming heating. In this way, the temperature of the optical switch can be maintained at the Curie point. In order to keep the refractive index matching material packed in the housing at an aimed temperature, at least part of the ceramic heater should be in contact with the refractive index matching material.

Figure 12:
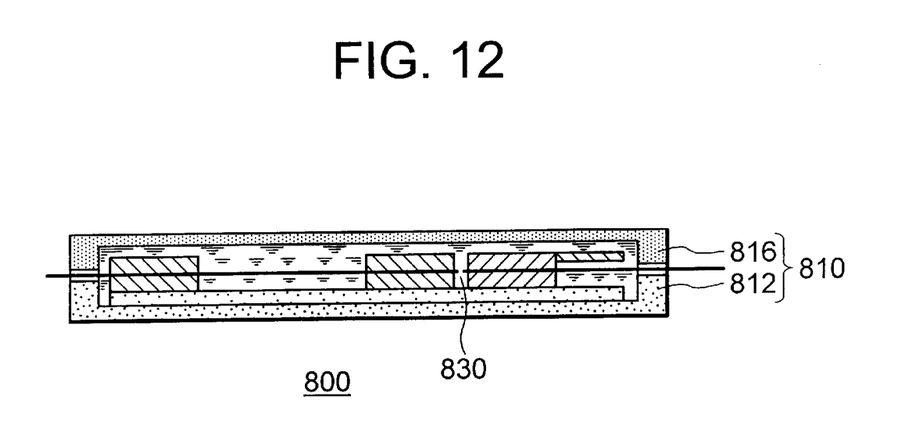
FIG. 12 is a longitudinal sectional view of FIG. 11.

By using as part of the housing a self-temperature controlled ceramic heater, which also serves as a heater and a temperature sensor, no separate temperature control circuit is required, and the need for increasing the size of the optical switch can be eliminated. In the previous examples shown in FIGS. 3 and 8, in which the substrates 150 and 650 having the heaters 156 and 656, and the temperature sensing means 158 and 658 are provided in the housing. That construction inevitably increases the size of the entire optical switch. As is evident from FIG. 12 which is a longitudinal sectional view of the optical switch 800, the use of a housing cover 816 comprising a ceramic heater eliminates the need for a separate heater. Thus, the thickness of the housing 810 is thinner compared with those in the previous examples. Two current-carrying lead wires 854 are provided at an end of the ceramic heater housing cover 816. Upon application of power, part of the ceramic heater lying between the two current-carrying lead wires 854 is first heated to increase the electric resistance in the vicinity thereof. As a result, current chooses to flow in other areas having lower resistance, thus gradually equalizing the entire temperature. Instead of the cover 816, the housing base 812 may be formed by a ceramic heater.

In this example where no separate controller is needed, moreover, there is no need for a power source for the controlling IC that would otherwise be used for the controller.

Test 1

In this test, the optical switch shown in FIGS. 1 through 3 were used, and the heating element thereof had the construction shown in FIG. 4. An optical switching mechanism (approx. 1.2 kg) having two input optical fibers and four output optical fibers was incorporated in a housing made of an alumina ceramic material having outside dimensions of 28 mm (length)×16 mm (width)×8 mm (height) and inside dimensions of 24 mm (length)×12 mm (width)×5.5 mm (height). A 1-kΩ heating element was formed by depositing a 0.3 mm-thick silicon carbide heating element film on a glass substrate of 0.5 mm (thickness)×22 mm×8 mm (size). An alumel-chromel thermocouple was also provided as a temperature sensing means on the glass substrate. The glass substrate having on the surface thereof the heating element and the temperature sensing means was fixedly fitted with an adhesive to the inside bottom surface of the ceramic housing cover, with the heating element and the temperature sensing means facing downward, and lead wires were drawn outside the housing cover. On the top surface of the housing cover provided was a through hole for pouring a refractive index matching material into the inside of the housing. After the refractive index matching material was charged into the housing, the through hole was sealed with adhesive. As the refractive index matching material, silicone oil (fluorosilicone oil) manufactured by Toray Dow-Corning Silicone Co., Ltd. was used. The silicone oil was poured through the through hole into the inside of the ceramic housing so as to ensure intimate contact of silicone oil with the optical switching mechanism and the heating element.

After the optical switch thus prepared had been held at 10 to 30° C., a 5-V d.c. voltage as an optical switch changeover signal was applied across the signal lead wires of the switch. This allowed a 0.2-A current to flow in the coil, changing over the optical switch.

Even when a 5-V d.c. voltage as an optical switch changeover signal was applied across the signal leads of the optical switch, which was kept at −10° C. after it had been held in a −10° C. thermostatic chamber for over two hours, the optical switch could not be changed over.

Next, when a 5-V d.c. optical-switch changeover signal was applied across the signal leads of the optical switch 250 seconds after a 12-V d.c. voltage was applied across the signal leads, a 0.2-A current flowed, allowing the optical switch to be changed over. It was found from the electromotive force generated in the alumel-chromel thermocouple that the temperature of the silicone oil at that time was approximately 13° C.

It was revealed from measurements that the viscosity of the silicone oil used in this example was 200 to 350 c.p. at normal temperatures, and 2500 c.p. at −10° C. This indicates that it was difficult to change over the optical switch at low temperatures at which the viscosity of the silicone oil used as a refractive index matching material increased, and the changeover of the optical switch was made easier by keeping the silicone oil at normal temperatures.

Test 2

Another optical switch having the same construction as that used in the above test and a reduced amount of refractive index matching material charged into the housing was prepared for comparison. That is, the optical switch used for comparison was such that the optical switching mechanism was completely immersed in the refractive index matching material, but the silicon carbide heating element provided on the upper part thereof was not in contact with the refractive index matching material, with an approx. 1-mm gap between the upper surface of the refractive index matching material and the surface of the heating element.

After this optical switch for comparison had been held in a −10° C. thermostatic chamber for over two hours, a 12-V d.c. voltage was applied across the optical switch heater leads for 250 seconds in a state where the entire optical switch was kept at −10° C., as described in the previous example, and then a 5-V d.c. optical-switch changeover signal was applied across the signal leads. This did not allow the optical switch to be changed over. The temperature of the silicone oil at that time measured by a separately provided alumel-chromel thermocouple was approximately −7° C.

Furthermore, when a 12-V d.c. voltage was applied across the optical switch heater lead wires for approximately 450 seconds, and then a 5-V d.c. optical-switch changeover signal was applied across the signal leads, a 0.2-A current flowed, allowing the optical switch to be changed over. The temperature of the silicone oil at that time measured by the alumel-chromel thermocouple was approximately −3° C.

As is evident from these tests, the temperature of the refractive index matching material can be easily increased to a usable level by a heater by immersing the heater in the refractive index matching material.

Test 3

In this test, the optical switch used in Test 1 was used, with the controller thereof set to a first predetermined value of −5° C. in the flow chart shown in FIG. 5 below which current was applied to the heater, and to a second predetermined value of 70° C. above which the power to the heater is turned off.

When an optical-switch changeover instruction was entered across the signal leads in a state where the optical switch was kept at −10° C., and a 12-V d.c. voltage was applied to the heater, the temperature of the optical switch was heated to −5° C. in 45 seconds, allowing the optical switch to be changed over.

With the heater kept turned on, the optical switch was taken out of the low-temperature thermostatic chamber and left to stand in an environment whose outdoor air temperature was 40° C., the temperature reached 70° C. in 360 seconds, causing the controller to actuate to turn off the power to the heater.

Test 4

In this test, the optical switch having the same construction as that used in Test 1 was used, but the heater used was a type as shown in FIG. 9, which has a PTC resistive element connected in series to the heating element; the PTC resistive element being a $BaTiO_3$ composition where part of Ba was replaced with Pb and part of Ti with Sn, that is, Ceramic No. 6 shown in EXAMPLE 4, having a Curie point of 10° C.

This optical switch was held in a −10° C. thermostatic chamber for over two hours, and then a 12-V d.c. was applied across the heater and the lead wire in a state where the optical switch was held at −10° C. 200 seconds after that, the switch was heated to 10° C. and kept at that level.

Test 5

In this test, the construction of the optical switch was the same as that used in Test 1, but the housing cover was made of a PTC ceramic material to make the cover itself a heating element. The PTC ceramic was Ceramic No. 6 shown in EXAMPLE 4 whose Curie point was 10° C.

This optical switch was held in a −10° C. thermostatic chamber for over two hours, and then a 12-V d.c. was applied across the heater and the lead wire in a state where the optical switch was held at −10° C. 210 seconds after that, the switch was heated to 10° C. and kept at that level.

What is claimed is:

1. An optical switch comprising:

a housing, a fixed optical-fiber holder for holding inside said housing at least one optical fiber end used for either of input or output, a movable optical-fiber holder for holding inside said housing at least one optical fiber end used for the other of input or output, which faces said fixed optical-fiber holder and is movable with respect to said fixed optical-fiber holder, a driver for moving said movable optical-fiber holder with respect to said fixed optical-fiber holder in such a manner that said input optical fiber end is caused to make a relative movement from or to a position where said input optical fiber end faces said output optical fiber end, a refractive index matching material packed inside said housing, which lies at least between said output optical fiber end and said input optical fiber end, a heater for heating said refractive index matching material in said housing, a means for sensing temperature inside said housing, and a controller for turning on or off power supply to said heater in accordance with said temperature sensing means.

2. An optical switch as set forth in claim 1, wherein said heater and said temperature sensing means are in contact with said refractive index matching material in said housing.

3. An optical switch as set forth in claim 2, wherein said controller turns on power supply to said heater when the measured value of said temperature sensing means is lower than a first predetermined value, and turns off the power supply when the measured value of said temperature sensing means is higher than a second predetermined value.

4. An optical switch as set forth in claim 3, wherein said controller drives said driver in accordance with the measured value of said temperature sensing means when a driver driving instruction is given from the outside.

5. An optical switch as set forth in claim 4, wherein said controller drives said driver with a delay of a predetermined time after the power supply to the heater is turned on.

6. An optical switch as set forth in claim 2, wherein a second temperature sensing means for sensing temperature outside said housing is provided.

7. An optical switch as set forth in claim 6, wherein said controller turns on power supply to said heater when the measured value of said second temperature sensing means is lower than a predetermined value, and turns off the power supply when the measured value of said temperature sensing means (internal temperature sensing means) is higher than a second predetermined value.

8. An optical switch comprising:

a housing, a fixed optical-fiber holder for holding inside said housing at least one optical fiber end used for either of input or output, a movable optical-fiber holder for holding inside said housing at least one optical fiber end used for the other of input or output, which faces said fixed optical-fiber holder and is movable with respect to said fixed optical-fiber holder, a driver for moving said movable optical-fiber holder with respect to said fixed optical-fiber holder in such a manner that said input optical fiber end is caused to make a relative movement from or to a position where said input optical fiber end faces said output optical fiber end, a refractive index matching material packed inside said housing, which lies at least between said output optical fiber end and said input optical fiber end, a heater for heating said refractive index matching material in said housing, and a PTC resistive element connected in series to said heater inside said housing.

9. An optical switch as set forth in claim 8, wherein said heater and said PTC resistive element are in contact with said refractive index matching material inside said housing.

10. An optical switch as set forth in claim 9, wherein said PTC resistive element has a Curie point within the range of 0° C. to 60° C.

11. An optical switch comprising:

a housing, a fixed optical-fiber holder for holding inside said housing at least one optical fiber end used for either of input or output, a movable optical-fiber holder for holding inside said housing at least one optical fiber end used for the other of input or output, which faces said fixed optical-fiber holder and is movable with respect to said fixed optical-fiber holder, a driver for moving said movable optical-fiber holder with respect to said fixed optical-fiber holder in such a manner that said input optical fiber end is caused to make a relative movement from or to a position where said input optical fiber end faces said output optical fiber end, a refractive index matching material packed inside said housing, which lies at least between said output optical fiber end and said input optical fiber end, a heater for heating said refractive index matching material in said housing, and a bimetal switch connected in series to said heater inside said housing.

12. An optical switch as set forth in claim 11, wherein said heater and said bimetal switch are in contact with said refractive index matching material inside said housing.

13. An optical switch as set forth in claim 12, wherein said bimetal switch is turned off within the range of 0° C. to 60° C.

14. An optical switch comprising:

a housing at least part of which is made of a self-temperature controlled ceramic heater, a fixed optical-fiber holder for holding inside said housing at least one optical fiber end used for either of input or output, a movable optical-fiber holder for holding inside said housing at least one optical fiber end used for the other of input or output, which faces said fixed optical-fiber holder and is movable with respect to said fixed optical-fiber holder, a driver for moving said movable optical-fiber holder with respect to said fixed optical-fiber holder in such a manner that said input optical fiber end is caused to make a relative movement from or to a position where said input optical fiber end faces said output optical fiber end, a refractive index matching material packed inside said housing, which lies at least between said output optical fiber end and said input optical fiber end, and current-carrying lead wires connected to said ceramic heater of said housing.

15. An optical switch as set forth in claim 14, wherein at least part of said ceramic heater is in contact with said refractive index matching material.

16. An optical switch as set forth in claim 15, wherein said self-temperature controlled ceramic heater is a PTC resistive element having a Curie point within the range of 0° C. to 60° C.

* * * * *